(12) United States Patent
Yerramalli et al.

(10) Patent No.: US 11,382,094 B2
(45) Date of Patent: Jul. 5, 2022

(54) OPTIMIZED SELF-CONTAINED TRANSMISSION IN NR-SS

(71) Applicant: QUALCOMM Incorporated, San Diego, CA (US)

(72) Inventors: Srinivas Yerramalli, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 16/134,517

(22) Filed: Sep. 18, 2018

(65) Prior Publication Data

US 2019/0116591 A1 Apr. 18, 2019

Related U.S. Application Data

(60) Provisional application No. 62/573,942, filed on Oct. 18, 2017.

(51) Int. Cl.
*H04W 72/04* (2009.01)
*H04W 16/14* (2009.01)
(Continued)

(52) U.S. Cl.
CPC ....... *H04W 72/0446* (2013.01); *H04L 1/1685* (2013.01); *H04L 1/1854* (2013.01); *H04W 16/14* (2013.01); *H04W 72/02* (2013.01); *H04W 72/042* (2013.01); *H04W 74/08* (2013.01); *H04L 1/1614* (2013.01); *H04L 1/1671* (2013.01);
(Continued)

(58) Field of Classification Search
None
See application file for complete search history.

(56) References Cited

U.S. PATENT DOCUMENTS

| 2015/0023324 A1 | 1/2015 | Logalbo et al. |
| 2017/0142705 A1 | 5/2017 | Chendamarai et al. |

(Continued)

FOREIGN PATENT DOCUMENTS

| WO | WO-2015050995 A2 | 4/2015 |
| WO | WO-2017105545 A1 | 6/2017 |
| WO | WO-2017127015 A1 | 7/2017 |

OTHER PUBLICATIONS

International Search Report and Written Opinion—PCT/US2018/051728—ISA/EPO—dated Dec. 19, 2018.
(Continued)

*Primary Examiner* — Jutai Kao
(74) *Attorney, Agent, or Firm* — Liem T. Do

(57) ABSTRACT

Optimized self-contained transmissions in new radio (NR) shared spectrum (NR-SS) networks are disclosed. In various aspect, during a transmission opportunity, the transmission configurations last slot of the transmission opportunity may be adjusted to provide a user equipment (UE) additional resource for processing and transmitting acknowledgement signaling. The transmission configurations adjusted may include sub-carrier spacing (SCS), uplink control channel formatting, and the like. Additional aspect provide for acknowledgement signaling from a first transmission opportunity to be requested and transmitted during the channel reservation signaling for the next transmission opportunity.

30 Claims, 10 Drawing Sheets

(51) Int. Cl.
> *H04W 72/02* (2009.01)
> *H04W 74/08* (2009.01)
> *H04L 1/18* (2006.01)
> *H04L 1/16* (2006.01)
> *H04L 5/00* (2006.01)
> *H04W 84/04* (2009.01)

(52) U.S. Cl.
> CPC .......... *H04L 5/0055* (2013.01); *H04L 5/0057* (2013.01); *H04W 74/0816* (2013.01); *H04W 84/042* (2013.01)

(56) References Cited

U.S. PATENT DOCUMENTS

| | | | | |
|---|---|---|---|---|
| 2019/0306852 | A1* | 10/2019 | Nayeb Nazar | H04W 72/0413 |
| 2019/0394009 | A1* | 12/2019 | Yoshimoto | H04W 72/04 |
| 2020/0037298 | A1* | 1/2020 | Shi | H04L 1/1812 |
| 2020/0106546 | A1* | 4/2020 | Takeda | H04W 72/0413 |
| 2020/0205140 | A1* | 6/2020 | Du | H04W 72/04 |

OTHER PUBLICATIONS

NTT DOCOMO et al., "Discussion on Channel Bandwidth and Subcarrier Spacing", 3GPP Draft; R4-1705742_CBW, 3RD Generation Partnership Project (3GPP), Mobile Competence Centre, 650, Route Des Lucioles, F-06921 Sophia-antipolis Cedex, France, vol. RAN WG4, No. Hangzhou, China, May 15, 2017-May 19, 2017, May 23, 2017 (May 23, 2017), 4 Pages, Retrieved from the Internet: URL:http://www.3gpp.org/ftp/tsg_ran/WG4_Radio/TSGR4_83/Docs/[retrieved on May 23, 2017].

\* cited by examiner

OPTIMIZED SELF-CONTAINED TRANSMISSION IN NR-SS

CROSS-REFERENCE TO RELATED APPLICATIONS

This application claims the benefit of U.S. Provisional Patent Application No. 62/573,942, entitled, "OPTIMIZED SELF-CONTAINED TRANSMISSION IN NR-SS," filed on Oct. 18, 2017, which is expressly incorporated by reference herein in its entirety.

BACKGROUND

Field

Aspects of the present disclosure relate generally to wireless communication systems, and more particularly, to optimized self-contained transmissions in new radio (NR) shared spectrum (NR-SS) networks.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes exchanging, by a user equipment (UE) with a serving base station, channel reservation signaling to secure communication access to a shared communication channel during a first transmission opportunity, receiving, by the UE, a plurality of downlink data transmissions from the serving base station during the first transmission opportunity, adjusting, by the UE, transmission configurations within a last slot of the first transmission opportunity, wherein the transmission configurations of the last slot are different from previous transmission configuration of previous slots of the first transmission opportunity, and transmitting, by the UE, acknowledgment signaling for one or more of the plurality of downlink data transmissions during the last slot.

In an additional aspect of the disclosure, a method of wireless communication includes receiving, by a UE, a plurality of downlink data transmissions from a serving base station on a shared communication channel during a first transmission opportunity, transmitting, by the UE, acknowledgment signaling during the first transmission opportunity for a subset of transmissions fewer than the plurality of downlink data transmissions, receiving, by the UE, a channel reservation request signal from the serving base station at a next transmission opportunity on the shared communication channel, wherein the channel reservation request signal includes an acknowledgement request for the acknowledgement signaling for one or more remaining transmissions of the plurality of downlink data transmission remaining unacknowledged, and transmitting, by the UE, the acknowledgement signaling for the one or more remaining transmissions within a channel reservation response signal from the UE in response to the channel reservation request signal.

In an additional aspect of the disclosure, an apparatus configured for wireless communication includes means for exchanging, by a UE with a serving base station, channel reservation signaling to secure communication access to a shared communication channel during a first transmission opportunity, means for receiving, by the UE, a plurality of downlink data transmissions from the serving base station during the first transmission opportunity, means for adjusting, by the UE, transmission configurations within a last slot of the first transmission opportunity, wherein the transmission configurations of the last slot are different from previous transmission configuration of previous slots of the first transmission opportunity, and means for transmitting, by the UE, acknowledgment signaling for one or more of the plurality of downlink data transmissions during the last slot.

In an additional aspect of the disclosure, an apparatus configured for wireless communication includes means for receiving, by a UE, a plurality of downlink data transmissions from a serving base station on a shared communication channel during a first transmission opportunity, means for transmitting, by the UE, acknowledgment signaling during the first transmission opportunity for a subset of transmissions fewer than the plurality of downlink data transmissions, means for receiving, by the UE, a channel reservation request signal from the serving base station at a next transmission opportunity on the shared communication channel, wherein the channel reservation request signal includes an acknowledgement request for the acknowledgement signaling for one or more remaining transmissions of the plurality of downlink data transmission remaining unacknowledged, and means for transmitting, by the UE, the acknowledgement signaling for the one or more remaining transmissions within a channel reservation response signal from the UE in response to the channel reservation request signal.

In an additional aspect of the disclosure, a non-transitory computer-readable medium having program code recorded thereon. The program code further includes code to exchange, by a UE with a serving base station, channel reservation signaling to secure communication access to a shared communication channel during a first transmission opportunity, code to receive, by the UE, a plurality of downlink data transmissions from the serving base station during the first transmission opportunity, code to adjust, by the UE, transmission configurations within a last slot of the first transmission opportunity, wherein the transmission configurations of the last slot are different from previous transmission configuration of previous slots of the first transmission opportunity, and code to transmit, by the UE, acknowledgment signaling for one or more of the plurality of downlink data transmissions during the last slot.

In an additional aspect of the disclosure, a non-transitory computer-readable medium having program code recorded thereon. The program code further includes code to receive, by a UE, a plurality of downlink data transmissions from a serving base station on a shared communication channel during a first transmission opportunity, code to transmit, by the UE, acknowledgment signaling during the first transmission opportunity for a subset of transmissions fewer than the plurality of downlink data transmissions, code to receive, by the UE, a channel reservation request signal from the serving base station at a next transmission opportunity on the shared communication channel, wherein the channel reservation request signal includes an acknowledgement request for the acknowledgement signaling for one or more remaining transmissions of the plurality of downlink data transmission remaining unacknowledged, and code to transmit, by the UE, the acknowledgement signaling for the one or more remaining transmissions within a channel reservation response signal from the UE in response to the channel reservation request signal.

In an additional aspect of the disclosure, an apparatus configured for wireless communication is disclosed. The apparatus includes at least one processor, and a memory coupled to the processor. The processor is configured to exchange, by a UE with a serving base station, channel reservation signaling to secure communication access to a shared communication channel during a first transmission opportunity, to receive, by the UE, a plurality of downlink data transmissions from the serving base station during the first transmission opportunity, to adjust, by the UE, transmission configurations within a last slot of the first transmission opportunity, wherein the transmission configurations of the last slot are different from previous transmission configuration of previous slots of the first transmission opportunity, and to transmit, by the UE, acknowledgment signaling for one or more of the plurality of downlink data transmissions during the last slot.

In an additional aspect of the disclosure, an apparatus configured for wireless communication is disclosed. The apparatus includes at least one processor, and a memory coupled to the processor. The processor is configured to receive, by a UE, a plurality of downlink data transmissions from a serving base station on a shared communication channel during a first transmission opportunity, to transmit, by the UE, acknowledgment signaling during the first transmission opportunity for a subset of transmissions fewer than the plurality of downlink data transmissions, to receive, by the UE, a channel reservation request signal from the serving base station at a next transmission opportunity on the shared communication channel, wherein the channel reservation request signal includes an acknowledgement request for the acknowledgement signaling for one or more remaining transmissions of the plurality of downlink data transmission remaining unacknowledged, and to transmit, by the UE, the acknowledgement signaling for the one or more remaining transmissions within a channel reservation response signal from the UE in response to the channel reservation request signal.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
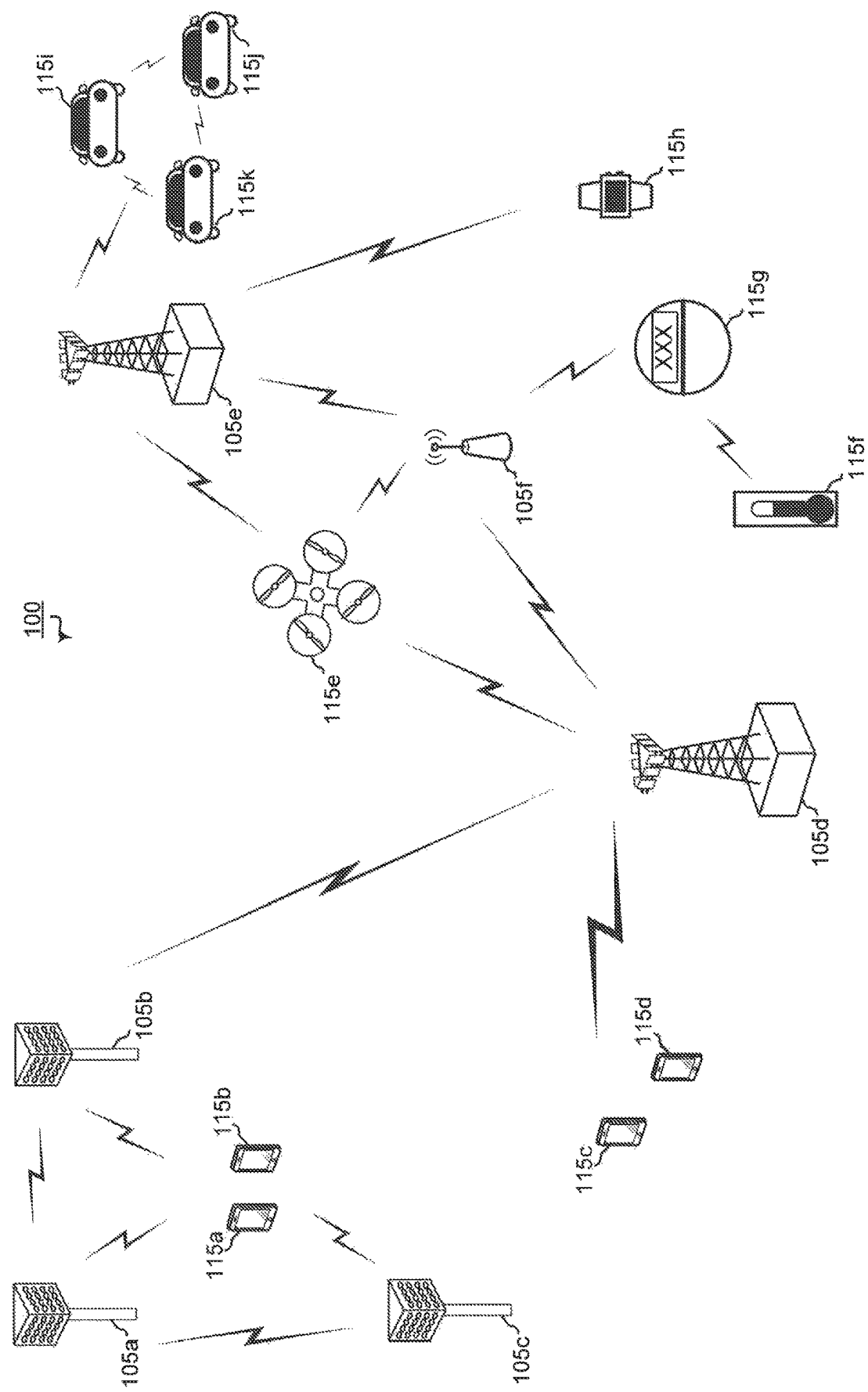
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mm Wave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries, 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
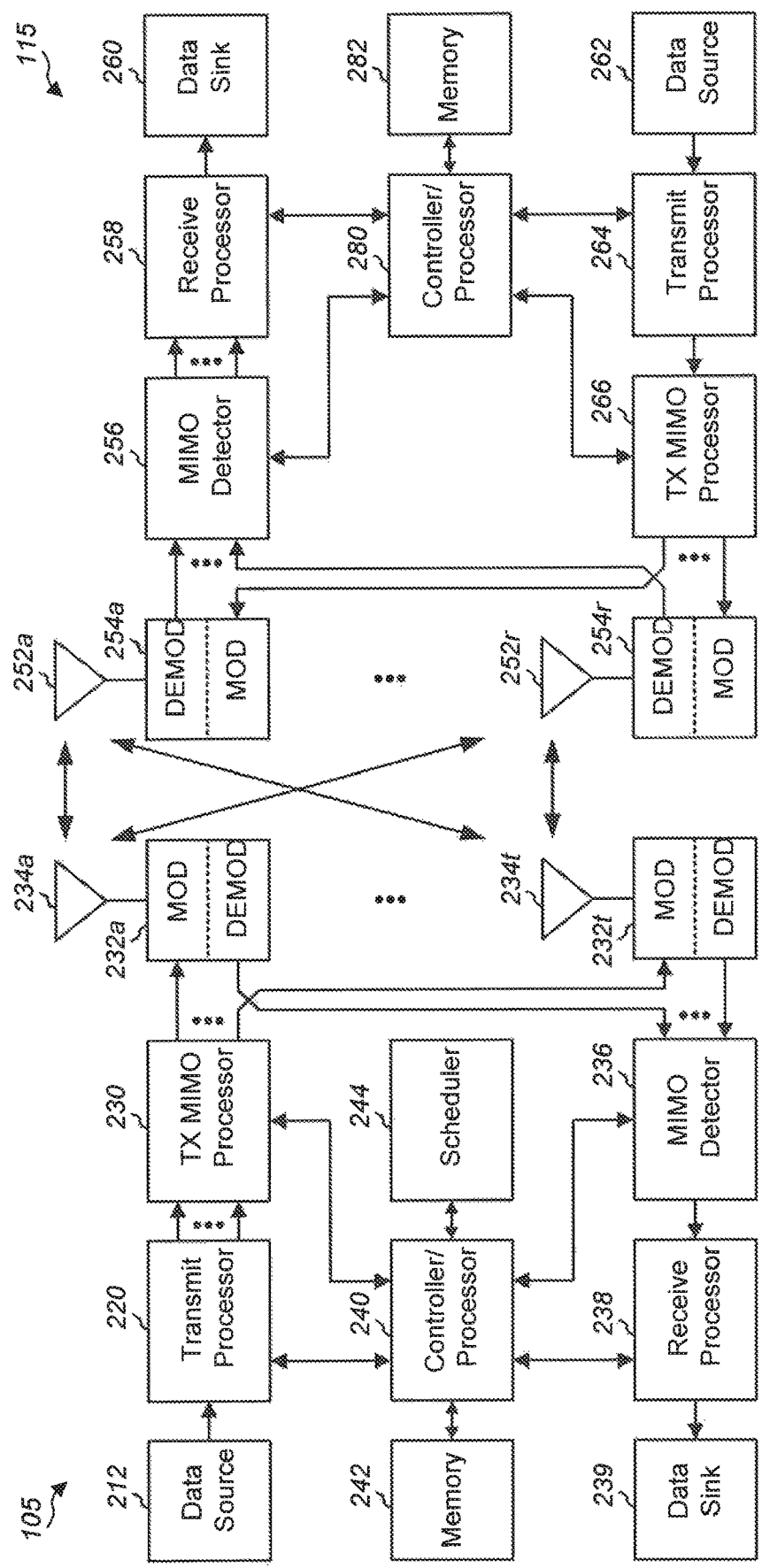
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODS) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be preceded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5 and 8, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own back-off window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
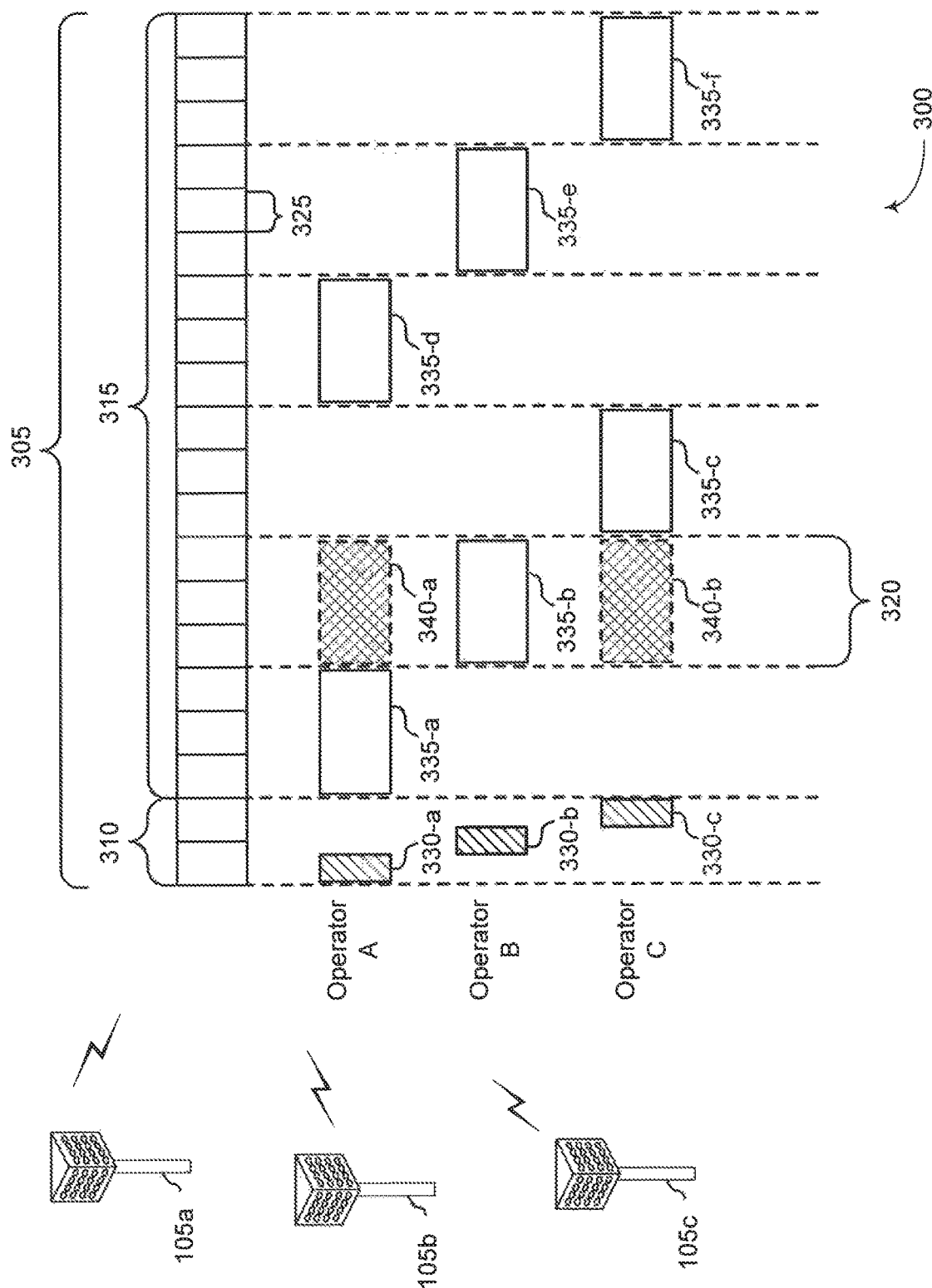
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320

(e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS), reservation request (RRQ), reservation response (RRS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-TNT for any network operating entity, and may be accessed on an opportunistic basis as described above.

In some examples, each subframe 325 may contain 14 symbols (e.g., 250-μs, for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-TNT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

In WiFi systems, the propagation delay may be fairly small as the size of the typical WiFi cell may be relatively small (e.g., 50 m indoor, 200 m outdoor), Typical WiFi systems are also designed to be asynchronous. In such systems the timing advance concept is generally not applied to transmissions. However, in NR-SS, where the transmissions are synchronized, use of timing advance adjustments may be useful. For example, the cell sizes of typically NR-SS deployments may be larger than WiFi networks (e.g., up to 500 m). Moreover, cloud RAN-based deployments may see a benefit in performance using a timing advance to account for gNB to remote radio head (RRH) delay, which can be up to a few vs typically, Use of such timing advance adjustments may impact the transmission and turnaround times for downlink-to-uplink and vice versa.

NR-SS systems include the concept of a self-contained slot, in which a base station transmits downlink data, the UE receives and decodes the data and then sends acknowledgement signaling (e.g., hybrid automatic repeat request (HARQ) acknowledgement (ACK)/negative ACK (NAK)) on uplink transmissions after a symbol guard period between. The one symbol guard period between the downlink-to-uplink transmission is the current budget. However, after accounting for switching times and a timing advance adjustment, the processing time at the UE may not be sufficient to determine and transmit ACK/NAK in one subframe or transmission time interval (TTI).

Figure 4:
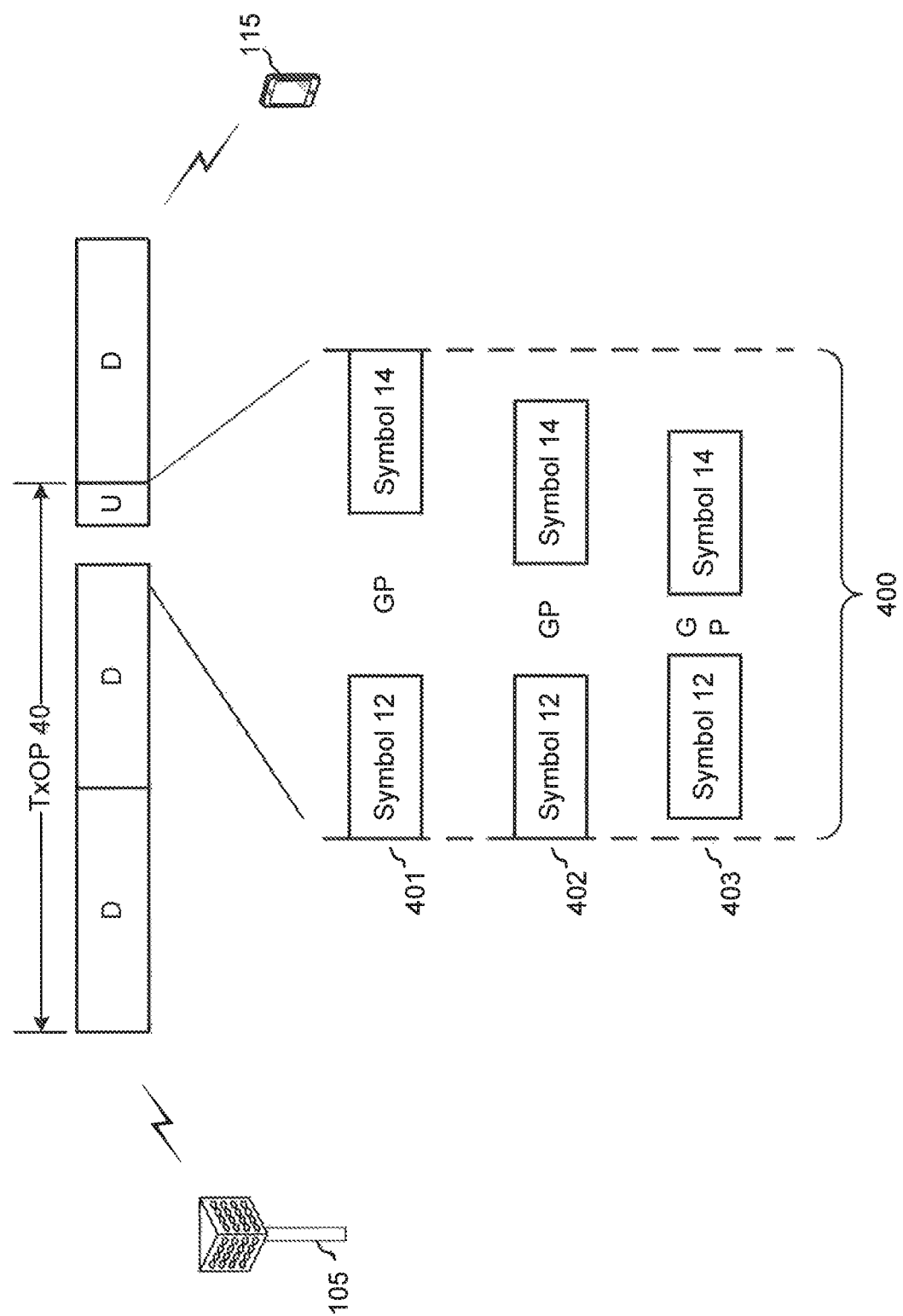
FIG. 4 is a block diagram illustrating a base station and a UE in communication over a NR-SS network deployment.

FIG. 4 is a block diagram illustrating a base station 105 and a UE 115 in communication over a NR-SS network deployment. Base station 105 and UE 115 communicate during transmission opportunity, TxOP 40, which includes two TTIs for downlink transmissions, in which the second TTI includes a downlink symbol (Symbol 12), a guard period (GP), and uplink symbol (Symbol 14) of ending symbols 400 in TxOP 40. Transmission stream 401 represents the ideal structure of ending symbols 400 of the last slot of the second. TTI. In an ideal transmission, base station 105 performs downlink transmissions and UE 115 receives the downlink transmissions immediately on the initial boundary of Symbol 12. UE 115 then has the entire symbol length of the guard period in order decode and determine the acknowledgement signaling, which is transmitted by UE 115 and simultaneously received by base station 105 on the uplink in the last symbol, Symbol 14, of TxOP 40. In the ideal transmission, there are no timing advance adjustment or switching time necessary.

Transmission stream 402 represents the actual structure of ending symbols 400 of the last slot of the second TTI, as seen by base station 105. Base station 105 immediately transmits the downlink data on the boundary of Symbol 12. There will be a switching delay inherent in the switch between downlink and uplink, which may be up to a certain amount of time (e.g., X µs). A timing advance adjustment may be made to accommodate this switching time. Thus, the length of the guard period is reduced, along with the amount time available for UE 115 to process and acknowledge the downlink transmission.

Transmission stream 403 represents the actual structure of ending symbols 400 of the last slot of the second TTI, as seen by UE 115. In addition to the switching delay that will be accounted for, there will be an over-the-air (OTA) delay between the transmission by base station 105 and the reception of the radio frequency (RF) signals by UE 115. This OTA delay (e.g., Y µs) may also be accounted for in a timing advance adjustment. With the additional. OTA delay, the guard period time is further shortened, further shortening the available processing time for UE 115 to receive, decode, process, and acknowledge the downlink communications.

Several solutions have been proposed, but not adopted, for addressing the shortened processing time resulting from accommodation of timing advance adjustments while maintaining an NR-SS self-contained slot. For example, a larger subcarrier spacing (SCS) is suggested for use during uplink transmissions to provide more processing time for the UE. The larger SCS is applicable for transmission of acknowledgment signaling (e.g., ACK/NAK) and CSI on shortened format short PUCCH (sPUCCH). In one implementation, acknowledgement signaling and CSI may be transmitted on separate symbols, while another implementation may include SRS or other non-time critical information in the first symbol and both acknowledgement signaling and CSI in another symbol.

If much larger SCS is used in the uplink, then more processing time can be obtained. However, different UEs may need different amounts of timing advance adjustment depending on the relative location in the cell. UEs which may need a larger timing advance may be allocated a higher SCS to obtain more processing time. While this reduces the number of resource blocks available for ACK/NAK transmissions, it may improve time-domain resources. For UEs that may need a smaller timing advance, a smaller SCS may be allocated, while still higher than the SCS used for downlink transmissions. When considering transmissions of UEs with different SCS, the transmissions may be multiplexed in frequency.

In another example implementation, the larger SCS is suggested for application to all uplink transmissions. Each of the UEs scheduled for transmission would use the same SCS, which is much larger SCS than in the downlink. In order to accommodate UEs having different timing advance characteristics, the HARQ-ACK for UEs with smaller timing advance characteristics may be transmitted in the earlier symbols, while the HARQ-ACK for UEs with larger timing advance characteristics may be transmitted in the later symbols.

For NR-SS operations, considerations may be given to maintaining a self-contained transmission opportunity before attempting to maintain a self-contained slot. Various aspects of the present disclosure are directed to enabling a self-contained transmission opportunity in NR-SS systems.

Figure 5:
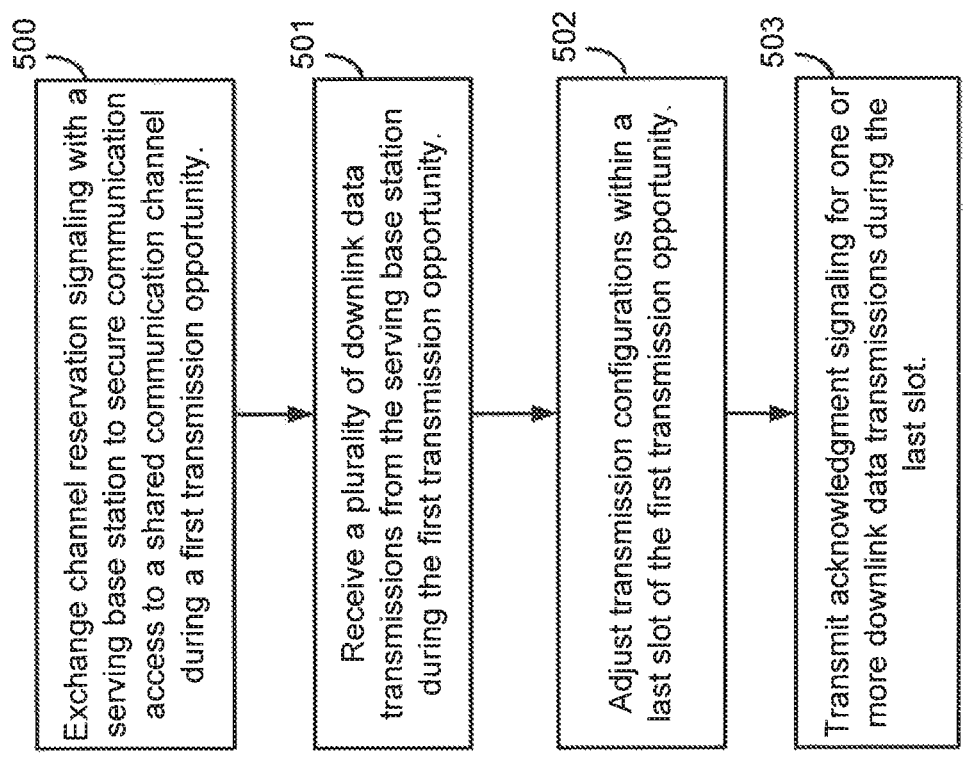
FIG. 5 is a block diagram illustrating example blocks executed to implement one aspect of the present disclosure.
Figure 10:
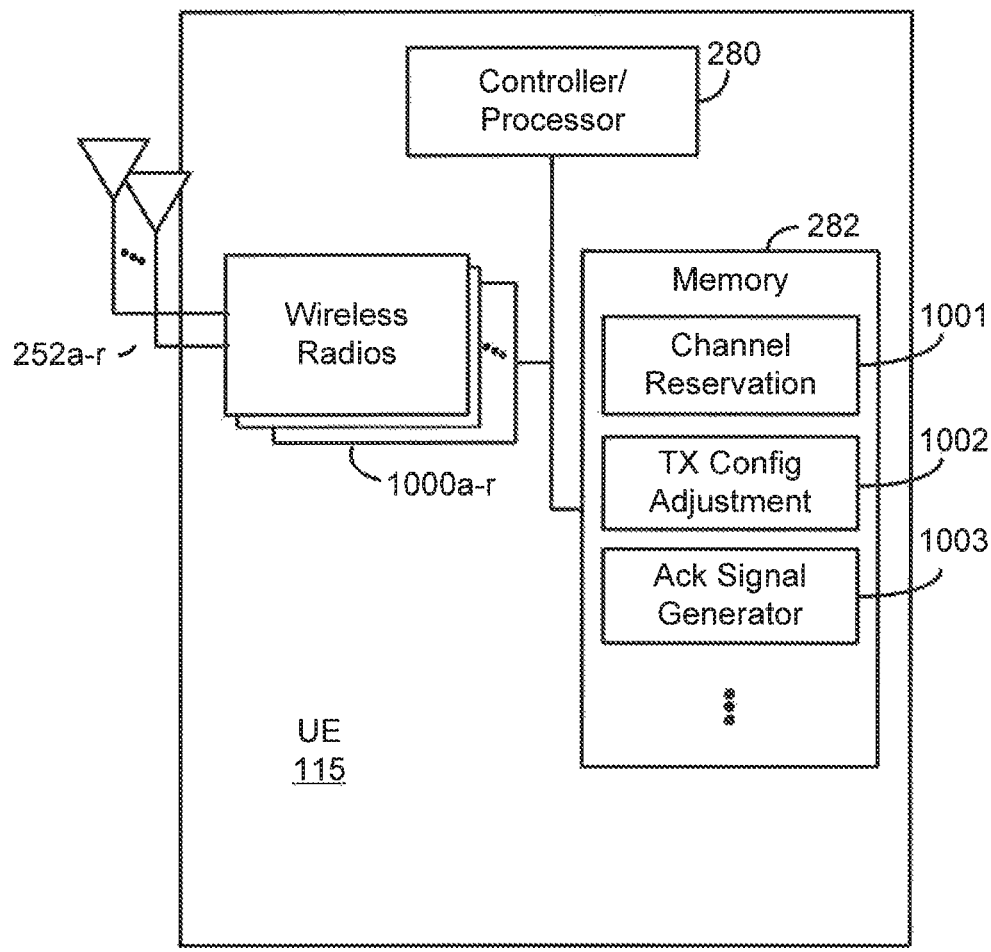
FIG. 10 is a block diagram illustrating an example UE configured according to aspects of the present disclosure.

FIG. 5 is a block diagram illustrating example blocks executed to implement one aspect of the present disclosure. The example blocks will also be described with respect to UP 115 as illustrated in FIG. 10. FIG. 10 is a block diagram illustrating UP 115 configured according to one aspect of the present disclosure. UE 115 includes the structure, hardware, and components as illustrated for UP 115 of FIG. 2. For example, UP 115 includes controller/processor 280, which operates to execute logic or computer instructions stored in memory 282, as well as controlling the components of UP 115 that provide the features and functionality of UE 115. UE 115, under control of controller/processor 280, transmits and receives signals via wireless radios 1000a-r and antennas 252a-r. Wireless radios 1000a-r includes various components and hardware, as illustrated in FIG. 2 for UE 115, including modulator/demodulators 254a-r, MIMO detector 256, receive processor 258, transmit processor 264, and TX MIMO processor 266.

At block 500, a UP exchanges channel reservation signaling with a serving base station to secure communication access to a shared communication channel during a first transmission opportunity. In an NR-SS system, the UE, such as UE 115, and base station communicate using shared spectrum. A listen before talk (LBT) operation may be performed, such as through exchange of channel reservation signaling (e.g., request-to-send (RTS)/clear-to-send (CTS) signaling, reservation request (RRQ), reservation response (RRS)). UP 115 executes, under control of controller/processor 280, executes channel reservation logic 1001, stored in memory 282. The execution environment of channel reservation logic 1001 allows UP 115 to detect the channel reservation request signal from the base station (e.g., RTS/RRS) and sends a channel reservation response signal (e.g., CTS/RRQ) to the base station in response.

At block 501, the UP receives a plurality of downlink data transmissions from the serving base station during the first transmission opportunity. After the channel is reserved, the serving base station may provide multiple downlink transmissions during the first transmission opportunity. UE 115 receives the data via antennas 252a-r and wireless radios 1000a-r. In the last subframe or TTI of the transmission opportunity, the downlink portion is followed guard period to allow for switching of transmission direction and then an uplink portion, used for block acknowledgement signaling.

At block 502, the UE adjusts transmission configurations within a last slot of the first transmission opportunity, wherein the transmission configurations of the last slot are different from previous transmission configuration of previous slots of the first transmission opportunity. According to the described aspects, UE 115, under control of controller/processor 280, executes transmission configuration adjustment logic 1002, stored in memory 282. The execution environment of transmission configuration adjustment logic 1002 provides for UE 115 to adjust the transmission configuration for the last slot of the transmission opportunity. For example, the adjustment may include increasing the SCS for the UE during the last slot for any uplink transmissions. The adjustment may also include configuring the last PUCCH of the transmission opportunity to a long format PUCCH instead of the sPUCCH format in the previous PUCCH of the transmission opportunity.

At block 503, the UE transmits acknowledgment signaling for one or more of the plurality of downlink data transmissions during the last slot. After adjusting the transmission configurations (e.g., larger SCS of last slot, or long PUCCH for last slot), UE 115 may transmit acknowledgement signaling (e.g., ACK/NAK) and channel state information for at least some of the downlink transmissions occurring during the transmission opportunity. UE 115, under control of controller processor 280, executes acknowledgement signal generator 1003, in memory 282. Acknowledgement signal generator 1003 operates the HARQ processes. When the downlink data transmissions are successfully decoded, UE 115 generates an ACK, and when the downlink data transmissions are not successful decoded, UE 115 generates a NACK.

Figure 6:
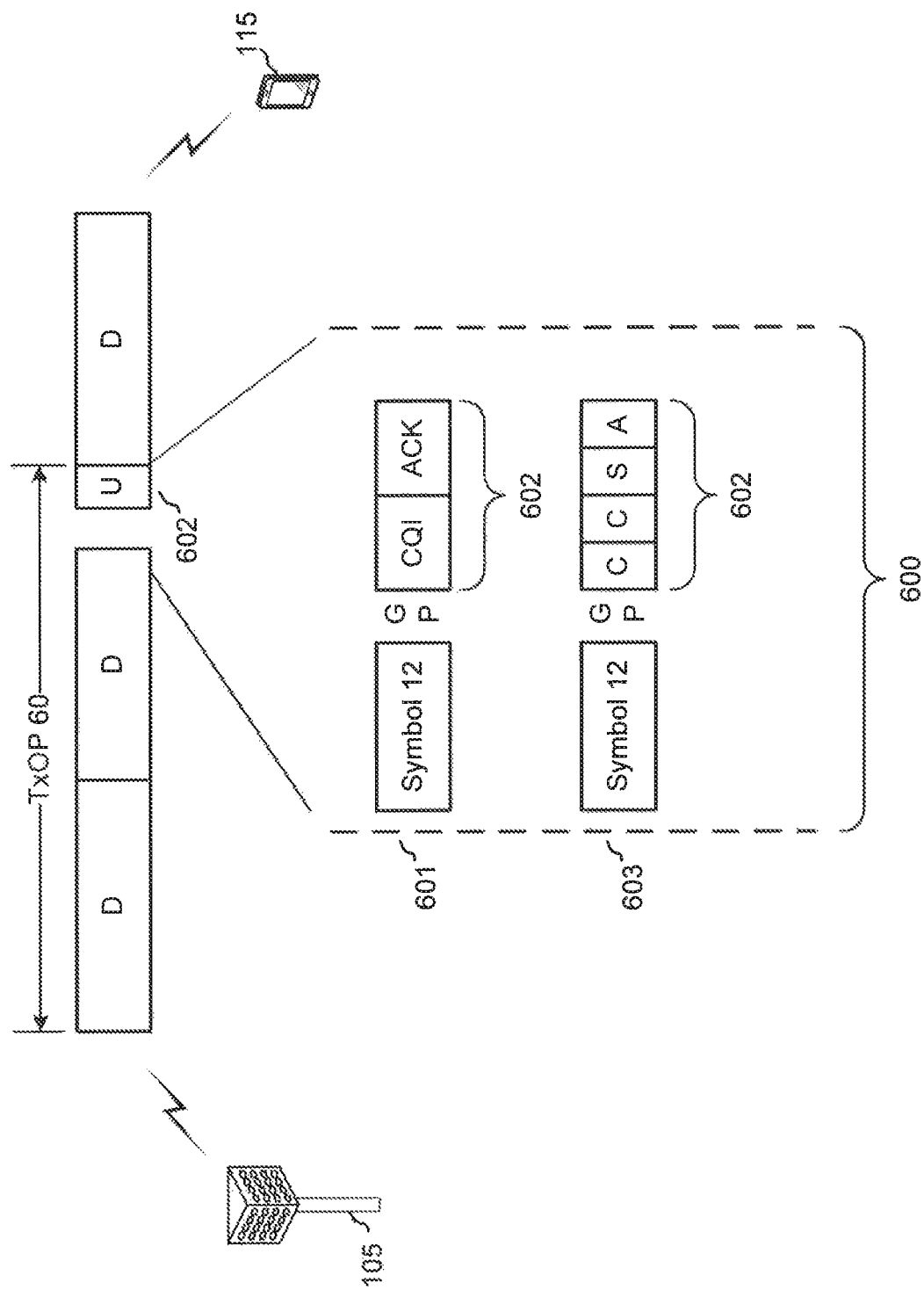
FIG. 6 is a block diagram illustrating a base station and a UE in communication over a NR-SS network deployment configured according to one aspect of the present disclosure.

FIG. 6 is a block diagram illustrating a base station 105 and a UE 115 in communication over a NR-SS network deployment configured according to one aspect of the present disclosure. Within transmission opportunity 60, base station 105 schedules two downlink TTIs, in which the second TTI includes ending symbols 600 comprising downlink and uplink portion 602 separated by a guard period to allow for switching between directions. UE 115 adjusts the SCS to a larger SCS in the last slot only in order to increase the processing time and symbols available for UE 115 in the boundaries of transmission opportunity 60. UE 115 uses the adjusted SCS to transmit acknowledgement signaling and CSI to base station 105. Each of the other slots in transmission opportunity 60 use the regularly-configured SCS. Only the SCS of the last slot is increased according to the example aspects of FIG. 6.

In a first example transmission stream over ending symbols 600, transmission stream 601, UE 115 adjusts its transmission configurations for the last slot of transmission opportunity 60 to increase the SCS. The larger SCS creates uplink portion 602 of the last slot having two symbol periods within the same time of single symbol under the lower SCS of the non-last slots of transmission opportunity 60. The value of the SCS that UE 115 uses to adjust to uplink portion 602 may be assigned or received from base station 105.

In a second example transmission stream over ending symbols 600, transmission stream 603 adjusts it transmission configuration for the last slot of transmission opportunity 60 to increase the SCS. The SCS of transmission stream 603 is even larger than the example described with respect to transmission stream 601. The resulting uplink transmission configurations includes uplink portion 602 having four possible symbols within the same period defined by the previous numerology.

It should be noted that different SCS may be assigned or scheduled to different UEs depending on the amount of processing that is expected at the UE. Thus, a UE that may be expected to perform a high amount of processing may receive instructions for a very high SCS, while a UE that may be expected to perform less processing may receive instruction for a lower SCS (but still higher than the standard numerology SCS assigned to the previous slots of the transmission opportunity).

Figure 7:
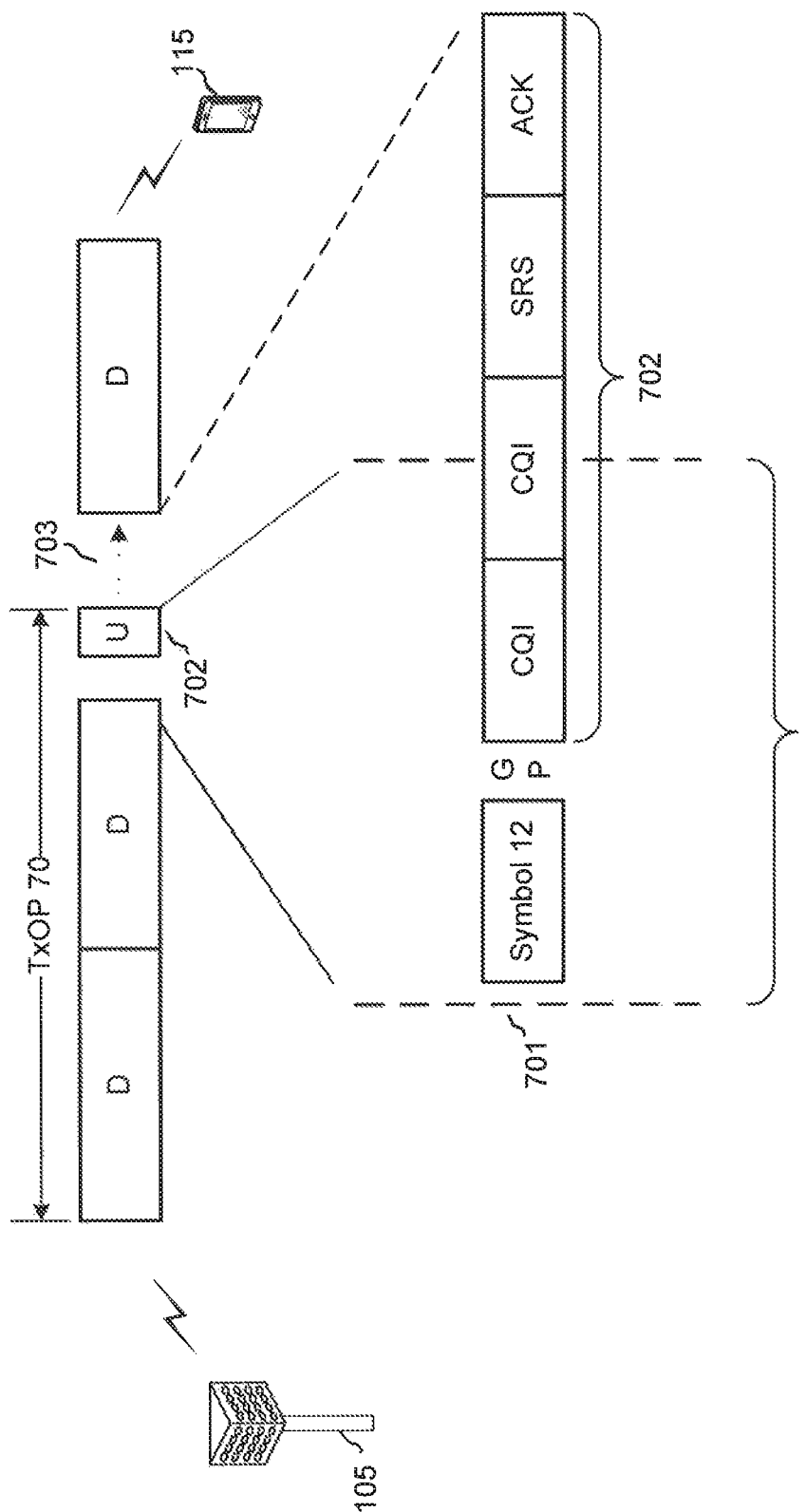
FIG. 7 is a block diagram illustrating a base station and a UE in communication over a NR-SS network deployment configured according to one aspect of the present disclosure.

FIG. 7 is a block diagram illustrating a base station 105 and a UE 115 in communication over a NR-SS network deployment configured according to one aspect of the present disclosure. Transmission opportunity 70 between base station 105 and UE 115 includes two TTIs in which the second TTI includes an uplink portion 702 after a guard period allowing the direction to switch from downlink at the last downlink symbol (Symbol 12) to uplink at uplink portion 702. According to the illustrated aspects, the transmission configuration for the last slot of transmission opportunity 70 is adjusted to change the format of the PUCCH transmitted by UE 115. For each PUCCH transmitted until the last slot, UE 115 is configured to transmit the short format PUCCH (sPUCCH). However, in the final slot of transmission configuration 70, UE 115 adjusts its transmission configurations to use a long format PUCCH. Therefore, after processing the received downlink data transmissions from base station 105 over the downlink portions of transmission opportunity 70, UE 115 may transmit acknowledgement signaling and CSI using the long format PUCCH.

The long format PUCCH may extend the uplink transmissions beyond the original boundary of transmission opportunity 70. Because communications between base station 105 and UE 115 are occurring over a shared communication channel that may be unlicensed, the effects of uplink portion 702 extending beyond the boundary of transmission opportunity 70 are not fatal. Base station 105 may continue receiving the uplink transmissions of the long format PUCCH of uplink portion 702. Any next signaling, whether by base station 105 or any other neighboring transmitter attempting access to the shared communication network would be delayed by a transmission extension 703. Each such transmitter would already typically perform an LBT procedure to determine whether the shared channel is already occupied (as here it would be), delay transmissions using a back-off or extended clear channel assessment (eCCA) procedure, or the like, and then, when the eCCA is detected to be successful, reserve the channel and prepare for transmissions. In such aspects, UE 115 is provided with adequate processing and transmission time while not disrupting the structure of the NR-SS communications, not only between base station 105 and UE 115, but between any other transmitter-receiver pair also using the shared communication channel for communications.

In LTE systems that operate using only unlicensed spectrum (e.g., MulteFire), there are facilities for multiple uplink channels carrying acknowledgement signaling to improve the signal diversity (e.g., sPUCCH, extended PUCCH (ePUCCH), PUSCH, and the like). According to additional aspects of the present disclosure, NR-SS networks configured according to additional aspects may provide for the base station, such as base station 105, to request UE 115 to provide all of the acknowledgement signaling for each slot either independently or jointly at any point within the transmission opportunity or even in the next transmission opportunity. For example, base station 105 may request UE 115 to transmit acknowledgement signaling for the two TTIs of TxOP 60 or TxOP 70 jointly, at ACK or 'A,' respectively, of uplink portion 602 or 702, or independently, such as if the acknowledgement signaling for the first TTI were send at the CQI, 'C,' or SRS, 'S' symbols, respectively, of uplink portions 602 or 702 and for the second TTI at ACK or 'A,'' respectively, of uplink portions 602 or 702. Moreover, as noted below, base station 105 may further request acknowledgement signaling for one transmission opportunity to be transmitted in a next transmission opportunity.

Figure 8:
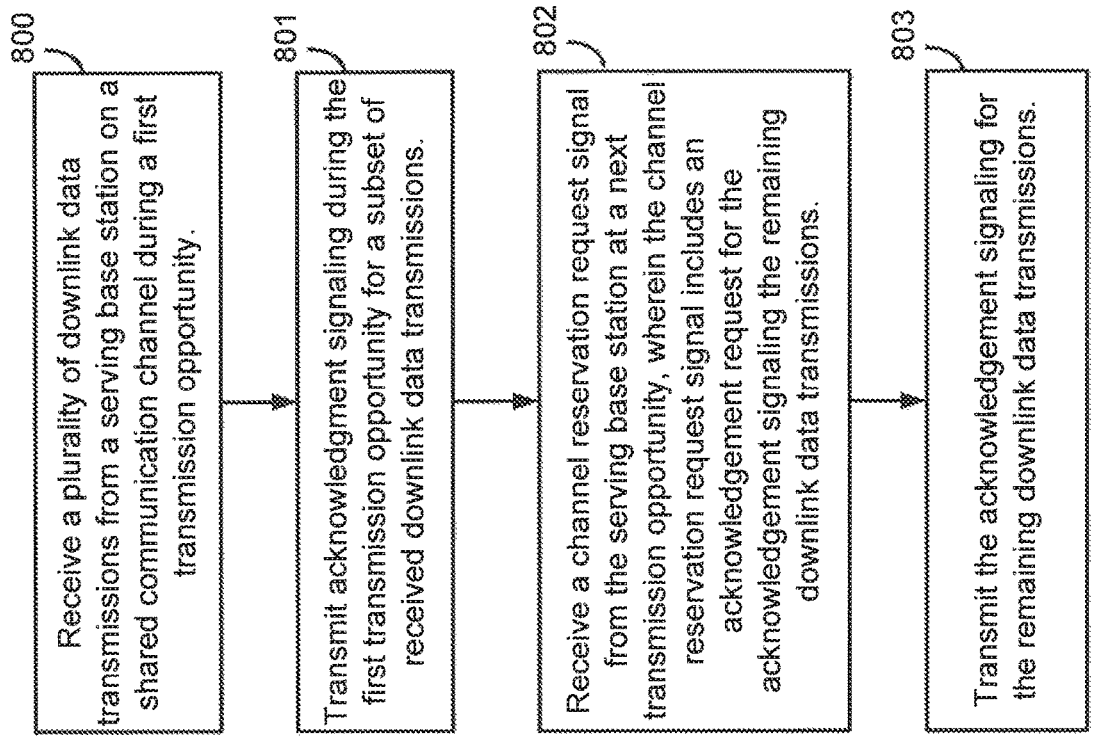
FIG. 8 is a block diagram illustrating example blocks executed to implement one aspect of the present disclosure.

FIG. 8 is a block diagram illustrating example blocks executed to implement one aspect of the present disclosure. The example blocks will also be described with respect to UE 115 as illustrated in FIG. 10.

At block 800, a UE receives a plurality of downlink data transmissions from a serving base station on a shared communication channel during a first transmission opportunity. In an NR-SS network, communications between the UE, such as UE 115, and serving base station described in FIG. 8 occur via a shared communication channel. As the transmitter-receiver pair secures the shared channel through channel reservation signaling, transmissions occur during reserved transmission opportunities over one or more TTIs scheduled for the transmission opportunity. When conducting downlink transmissions, the serving base station may transmit data using multiple downlink TTIs scheduled during the transmission opportunity, UE 115 receives the downlink transmissions via antennas 252*a-r* and wireless radios 1000*a-r*.

At block 801, the UE transmits acknowledgment signaling during the first transmission opportunity for a subset of transmissions fewer than the plurality of downlink data transmissions. At the end of the transmission opportunity, an uplink portion following a guard period after the last downlink signal, provides UE 115 an opportunity to transmit block acknowledgement signaling to the serving base station for the multiple downlink transmissions. UE 115, under control of controller processor 280, executes acknowledgement signal generator 1003, in memory 282. Acknowledgement signal generator 1003 operates the HARQ processes. When the downlink data transmissions are successfully decoded, UE 115 generates an ACK, and when the downlink data transmissions are not successful decoded, UE 115 generates a NACK. According to the described example, UE 115 here transmits acknowledgement signaling for fewer than the number of downlink transmissions that occurred over the transmission opportunity. The execution environment of acknowledgement signal generator 1003 generates the acknowledgement signaling for all of the downlink transmissions, but UE 115 may only send some of them in the last slot of the transmission opportunity.

At block 802, the UE receives a channel reservation request signal from the serving base station at a next transmission opportunity on the shared communication channel, wherein the channel reservation request signal includes an acknowledgement request for the acknowledgement signaling for one or more remaining transmissions of the plurality of downlink data transmission remaining unacknowledged. Following the ending boundary of the previous transmission opportunity, the serving base station and UE 115 again exchange channel reserving signaling, such as RTS/CTS or RRQ/RRS in order to reserve access to the shared channel. UE 115 executes, under control of controller/processor 280, executes channel reservation logic 1001, stored in memory 282. The execution environment of channel reservation logic 1001 allows UE 115 to detect the channel reservation request signal from the base station (e.g., RTS/RRS) and sends a channel reservation response signal (e.g., CTS/RRQ) to the base station in response. However, according to the described aspect of the present disclosure, the channel reservation signaling from the serving base station (e.g., RTS/RRQ) includes a specific request to UE 115 to send any remaining acknowledgement signaling for the data transmissions of the previous transmission opportunity.

At block 803, the UE transmits the acknowledgement signaling for the one or more remaining transmissions within a channel reservation response signal from the UE in response to the channel reservation request signal. UE 115 executes, under control of controller/processor 280, executes channel reservation logic 1001, stored in memory 282. The execution environment of channel reservation logic 1001 allows UE 115 to detect the channel reservation request signal from the base station (e.g., RTS/RRS) and sends a channel reservation response signal (e.g., CTS/RRQ) to the base station in response. After receiving the channel reservation request signal from the serving base station (e.g., RTS/RRQ) that includes the request for acknowledging the remaining downlink transmissions from the previous transmission opportunity, UE 115 may respond to the channel reservation request signal by transmitting its channel reservation response signal (e.g., CTS/RRS) embedded within the remaining acknowledgement signaling generated within the execution environment of acknowledgement signal generator 1003. Thus, during the channel reservation signaling for the next transmission opportunity, the serving base station may receive the remaining acknowledgements (ACK/NAK) for the transmissions of the previous transmission opportunity. As this is received at the beginning of this next transmission opportunity, there would be time for the serving base station to perform further transmissions in this next transmission opportunity based on the response of the acknowledgment signaling.

Figure 9:
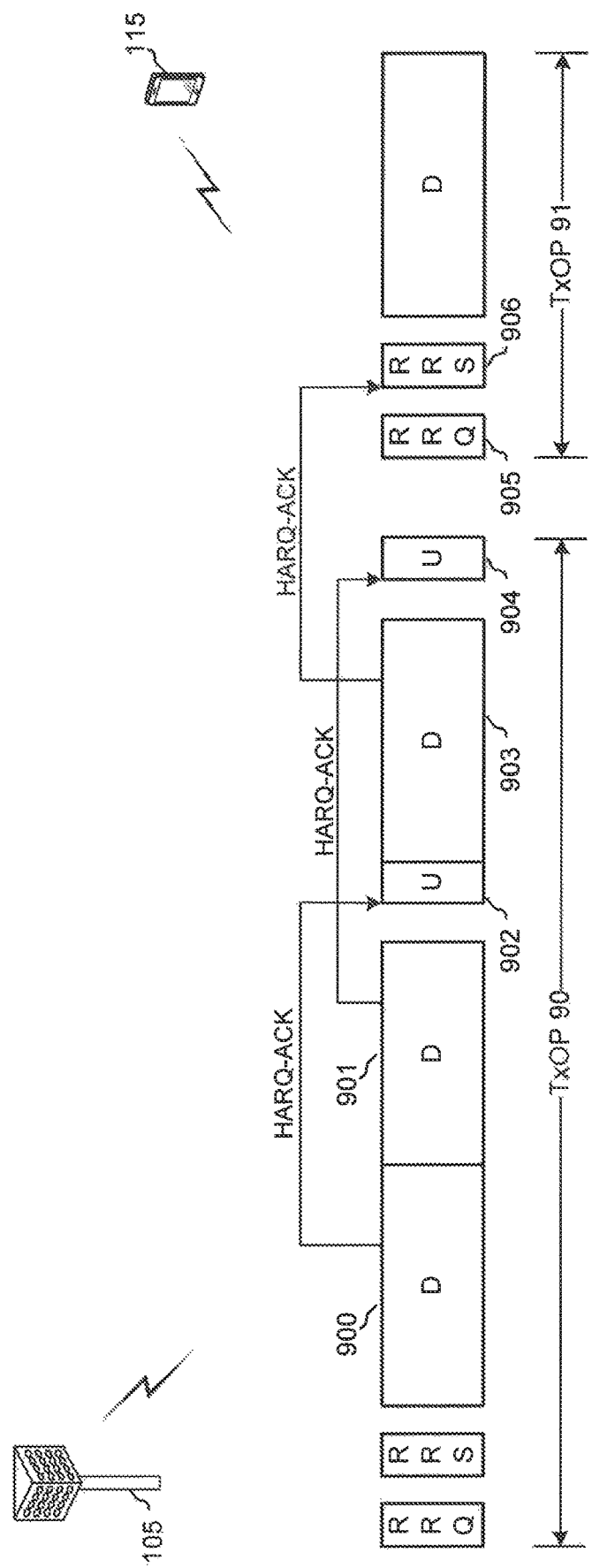
FIG. 9 is a block diagram illustrating a base station and a UE, configured according to one aspect of the present disclosure, communicating in an NR-SS system over a shared communication channel.

FIG. 9 is a block diagram illustrating base station 105 and UE 115, configured according to one aspect of the present disclosure, communicating in an NR-SS system over a shared communication channel. In securing communications over a first transmission opportunity, TxOP 90, base station 105 and UE 115 exchange channel reservation signaling (e.g., RRQ and RRS or RTS and CTS). For NR-SS in some scenarios, it may not be possible to transmit all of the acknowledgement signaling in the same transmission opportunity. In such cases, the base station, such as base station 105, may have to wait until the next transmission opportunity to receive the acknowledgement signaling from UE 115. However, this may result in using a larger number of acknowledgement processes, as the acknowledgement timeline is no longer "self-contained."

In order to address this potential issue, the described aspect of the present disclosure provides that any still-pending acknowledgement signaling of the previous transmission opportunity, such as TxOP 90, may be transmitted in the channel reservation signaling of the next transmission opportunity, such as TxOP 901. For example, during TxOP 90, base station 105 makes multiple downlink data transmissions via TTI 900, TTI 901, and TTI 903. After the first guard period of TxOP 90, UE 115 only transmits the acknowledgement signaling for TTI 900 during uplink symbol 902. Similarly, after the second guard period of TxOP 90, UE 115 only further transmits the acknowledgement signaling for TTI 901 during uplink symbol 904. Thus, at the end of TxOP 90, there is still acknowledgement signaling remaining to be transmitted for the downlink transmissions at TTI 903.

At the beginning of the next transmission opportunity, TxOP 91, base station 105 and UE 115 exchange channel reservation signaling (RRQ 905 and RRS 906). Within RRQ 905, base station 105 includes a request for UE 115 to send the remaining acknowledgement signaling. UE 115 responds by embedding the remaining acknowledgement signaling for TTI 903 within its channel reservation response signal, RRS 906. Base station 105 may then use the acknowledgement signaling information embedded in RRS 90 to continue transmission in the data portion of TxOP 91. For example, if, without the acknowledgement signaling for TTI 903, base station 105 were planning to reseed the data it previously sent in TTI 903, base station 105 may now continue with transmission of the next set of data. Conversely, if base station 105 were planning to send the next set of data in the data sequence, if the acknowledgement signaling indicated a NAK, then base station 105 may re-send the data it previously sent in TTI 903 in the data portion of TxOP 91.

It should be noted that the request for acknowledgement signals embedded in RRQ 905 may be made using dedicated or common signaling. The various aspects of the present disclosure are not restricted to one means for transmitting the acknowledgement signaling request in the RRQ.

It should further be noted that base station 105 may request some or all of the acknowledgement signaling to be transmitted, either independently or jointly, in the channel reservation signaling (RTS/CTS or RRQ/RRS) when a previous acknowledgement signaling is lost.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5 and 8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
exchanging, by a user equipment (UE) with a serving base station, channel reservation signaling to secure communication access to a shared communication channel during a first transmission opportunity;
receiving, by the UE, a plurality of downlink data transmissions from the serving base station during the first transmission opportunity;
adjusting, by the UE, transmission configurations within a last slot of the first transmission opportunity by modifying a subcarrier spacing of the last slot to be different from subcarrier spacings of each previous slot of the first transmission opportunity to increase a number of symbols available for transmission of signaling by the UE within the last slot of the first transmission opportunity, wherein the transmission configurations of the last slot are different from a previous transmission configuration of previous slots of the first transmission opportunity, and wherein one or more additional symbols of the last slot included in the first transmission opportunity extend beyond an original boundary of the first transmission opportunity;

receiving, by the UE, an acknowledgement request signal, wherein the acknowledgement request signal requests acknowledgement signaling from the UE according to one of:
  independently for each slot of the first transmission opportunity; or
  jointly for the first transmission opportunity; and transmitting, by the UE, the acknowledgement signaling for one or more of the plurality of downlink data transmissions during the last slot.

2. The method of claim 1, wherein the transmitting the acknowledgement signaling includes transmitting:
  a hybrid automatic repeat request (HARQ) acknowledgement (ACK);
  an HARQ negative ACK (NAK); or
  a channel quality indicator (CQI).

3. The method of claim 2, further including:
  re-adjusting, by the UE, a next subcarrier spacing to begin a next transmission opportunity of the serving base station.

4. The method of claim 1, wherein the adjusting includes:
  configuring, by the UE, a physical uplink control channel (PUCCH) configuration to a long PUCCH configuration for the last slot, wherein the previous transmission configuration of the previous slots include a short PUCCH configuration.

5. The method of claim 4, wherein the transmitting includes:
  transmitting the acknowledgement signaling in the one or more additional symbols according to the long PUCCH configuration without regard to a scheduled end time of the first transmission opportunity.

6. The method of claim 1, further including:
  receiving, by the UE, signaling from the serving base station, wherein the signaling from the serving base station identifies an adjustment for the transmission configurations of the last slot.

7. The method of claim 1, wherein the acknowledgement request signal further includes:
  a time for the transmitting the acknowledgement signaling, wherein the time includes one of: a scheduled time within the first transmission opportunity, a last time within the last slot, or a next time during a next transmission opportunity.

8. The method of claim 7, wherein the next time includes during next channel reservation signaling exchanged between the UE and the serving base station for the next transmission opportunity.

9. An apparatus configured for wireless communication, comprising:
  means for exchanging, by a user equipment (UE) with a serving base station, channel reservation signaling to secure communication access to a shared communication channel during a first transmission opportunity;
  means for receiving, by the UE, a plurality of downlink data transmissions from the serving base station during the first transmission opportunity;
  means for adjusting, by the UE, transmission configurations within a last slot of the first transmission opportunity by modifying a subcarrier spacing of the last slot to be different from subcarrier spacings of each previous slot of the first transmission opportunity to increase a number of symbols available for transmission of signaling by the UE within the last slot of the first transmission opportunity, wherein the transmission configurations of the last slot are different from a previous transmission configuration of previous slots of the first transmission opportunity, and wherein one or more additional symbols of the last slot included in the first transmission opportunity extend beyond an original boundary of the first transmission opportunity;
  means for receiving, by the UE, an acknowledgement request signal, wherein the acknowledgement request signal requests acknowledgement signaling from the UE according to one of:
    independently for each slot of the first transmission opportunity; or
    jointly for the first transmission opportunity; and
  means for transmitting, by the UE, acknowledgement signaling for one or more of the plurality of downlink data transmissions during the last slot.

10. The apparatus of claim 9, wherein the means for transmitting the acknowledgement signaling includes means for transmitting:
  a hybrid automatic repeat request (HARQ) acknowledgement (ACK);
  an HARQ negative ACK (NAK); or
  a channel quality indicator (CQI).

11. The apparatus of claim 10, further including:
  means for re-adjusting, by the UE, a next subcarrier spacing to begin a next transmission opportunity of the serving base station.

12. The apparatus of claim 9, wherein the means for adjusting includes:
  means for configuring, by the UE, a physical uplink control channel (PUCCH) configuration to a long PUCCH configuration for the last slot, wherein the previous transmission configuration of the previous slots include a short PUCCH configuration.

13. The apparatus of claim 12, wherein the means for transmitting includes:
  means for transmitting the acknowledgement signaling in the one or more additional symbols according to the long PUCCH configuration without regard to a scheduled end time of the first transmission opportunity.

14. The apparatus of claim 9, further including:
  means for receiving, by the UE, signaling from the serving base station, wherein the signaling from the serving base station identifies an adjustment for the transmission configurations of the last slot.

15. The apparatus of claim 9, wherein the acknowledgement request signal further includes:
  a time for the means for transmitting the acknowledgement signaling, wherein the time includes one of: a scheduled time within the first transmission opportunity, a last time within the last slot, or a next time during a next transmission opportunity.

16. The apparatus of claim 15, wherein the next time includes during next channel reservation signaling exchanged between the UE and the serving base station for the next transmission opportunity.

17. A non-transitory computer-readable medium having program code recorded thereon, the program code comprising:
  program code executable by a computer for causing the computer to exchange, by a user equipment (UE) with a serving base station, channel reservation signaling to secure communication access to a shared communication channel during a first transmission opportunity;
  program code executable by the computer for causing the computer to receive, by the UE, a plurality of downlink data transmissions from the serving base station during the first transmission opportunity;
  program code executable by the computer for causing the computer to adjust, by the UE, transmission configurations within a last slot of the first transmission opportunity by modifying a subcarrier spacing of the last slot to be different from subcarrier spacings of each previous slot of the first transmission opportunity to increase a number of symbols available for transmission of signaling by the UE within the last slot of the first transmission opportunity, wherein the transmission configurations of the last slot are different from a previous transmission configuration of previous slots of the first transmission opportunity, wherein one or more additional symbols of the last slot included in the first transmission opportunity extend beyond an original boundary of the first transmission opportunity;
  program code executable by the computer for causing the computer to receive, by the UE, an acknowledgement request signal, wherein the acknowledgement request signal requests acknowledgement signaling from the UE according to one of:
    independently for each slot of the first transmission opportunity; or
    jointly for the first transmission opportunity; and
  program code executable by the computer for causing the computer to transmit, by the UE, acknowledgement signaling for one or more of the plurality of downlink data transmissions during the last slot.

18. The non-transitory computer-readable medium of claim 17, wherein the program code executable by the computer for causing the computer to transmit the acknowledgement signaling includes program code executable by the computer for causing the computer to transmit:
  a hybrid automatic repeat request (HARQ) acknowledgement (ACK);
  an HARQ negative ACK (NAK); or
  a channel quality indicator (CQI).

19. The non-transitory computer-readable medium of claim 18, further including:
  program code executable by the computer for causing the computer to re-adjust, by the UE, a next subcarrier spacing to begin a next transmission opportunity of the serving base station.

20. The non-transitory computer-readable medium of claim 17, wherein the program code executable by the computer for causing the computer to adjust includes:
  program code executable by the computer for causing the computer to configure, by the UE, a physical uplink control channel (PUCCH) configuration to a long PUCCH configuration for the last slot, wherein the previous transmission configuration of the previous slots include a short PUCCH configuration.

21. The non-transitory computer-readable medium of claim 20, wherein the program code executable by the computer for causing the computer to transmit includes:
  program code executable by the computer for causing the computer to transmit the acknowledgement signaling in the one or more additional symbols according to the long PUCCH configuration without regard to a scheduled end time of the first transmission opportunity.

22. The non-transitory computer-readable medium of claim 17, further including:
  program code executable by the computer for causing the computer to receive, by the UE, signaling from the serving base station, wherein the signaling from the serving base station identifies an adjustment for the transmission configurations of the last slot.

23. The non-transitory computer-readable medium of claim 17, wherein the acknowledgement request signal further includes:
  a time for execution of the program code executable by the computer for causing the computer transmit the acknowledgement signaling, wherein the time includes one of: a scheduled time within the first transmission opportunity, a last time within the last slot, or a next time during a next transmission opportunity.

24. The non-transitory computer-readable medium of claim 23, wherein the next time includes during next channel reservation signaling exchanged between the UE and the serving base station for the next transmission opportunity.

25. An apparatus configured for wireless communication, the apparatus comprising:
  at least one processor; and
  a memory coupled to the at least one processor,
  wherein the at least one processor is configured:
    to exchange, by a user equipment (UE) with a serving base station, channel reservation signaling to secure communication access to a shared communication channel during a first transmission opportunity;
    to receive, by the UE, a plurality of downlink data transmissions from the serving base station during the first transmission opportunity;
    to adjust, by the UE, transmission configurations within a last slot of the first transmission opportunity by modifying a subcarrier spacing of the last slot to be different from subcarrier spacings of each previous slot of the first transmission opportunity to increase a number of symbols available for transmission of signaling by the UE within the last slot of the first transmission opportunity, wherein the transmission configurations of the last slot are different from a previous transmission configuration of previous slots of the first transmission opportunity, and wherein one or more additional symbols of the last slot included in the first transmission opportunity extend beyond an original boundary of the first transmission opportunity;
    to receive, by the UE, an acknowledgement request signal, wherein the acknowledgement request signal requests acknowledgement signaling from the UE according to one of:
      independently for each slot of the first transmission opportunity; or
      jointly for the first transmission opportunity; and
    to transmit, by the UE, acknowledgement signaling for one or more of the plurality of downlink data transmissions during the last slot.

26. The apparatus of claim 25, wherein the at least one processor is configured to transmit the acknowledgement signaling includes configuration to transmit:
  a hybrid automatic repeat request (HARQ) acknowledgement (ACK);

an HARQ negative ACK (NAK); and a channel quality indicator (CQI).

27. The apparatus of claim 26, wherein the at least one processor is further configured to re-adjust, by the UE, a next subcarrier spacing to begin a next transmission opportunity of the serving base station.

28. The apparatus of claim 25,
wherein, to adjust the transmission configurations, the at least one processor is further configured to configure, by the UE, a physical uplink control channel (PUCCH) configuration to a long PUCCH configuration for the last slot, wherein the previous transmission configuration of the previous slots include a short PUCCH configuration, and
wherein, to transmit the acknowledgement signaling, the at least one processor is further configured to transmit the acknowledgement signaling in the one or more additional symbols according to the long PUCCH configuration without regard to a scheduled end time of the first transmission opportunity.

29. The apparatus of claim 25, wherein the at least one processor is further configured to receive, by the UE, signaling from the serving base station, wherein the signaling from the serving base station identifies an adjustment for the transmission configurations of the last slot.

30. The apparatus of claim 25, wherein the acknowledgement request signal further includes:
a time for execution of the at least one processor to transmit the acknowledgement signaling, wherein the time includes one of: a scheduled time within the first transmission opportunity, a last time within the last slot, or a next time during a next transmission opportunity, and wherein the next time includes during next channel reservation signaling exchanged between the UE and the serving base station for the next transmission opportunity.

* * * * *